US012149329B2

(12) United States Patent
Nagashima (10) Patent No.: US 12,149,329 B2
(45) Date of Patent: Nov. 19, 2024

(54) DATA ENCODING DEVICE, DATA TRANSMISSION SYSTEM, DATA ENCODING METHOD, AND DATA ENCODING PROGRAM

(71) Applicant: MITSUBISHI HEAVY INDUSTRIES, LTD., Tokyo (JP)

(72) Inventor: Tetsuya Nagashima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 29 days.

(21) Appl. No.: 18/174,282

(22) Filed: Feb. 24, 2023

(65) Prior Publication Data
US 2024/0146397 A1 May 2, 2024

(30) Foreign Application Priority Data

Oct. 27, 2022 (JP) ................................ 2022-172286

(51) Int. Cl.
*H04B 7/185* (2006.01)
*H04L 69/04* (2022.01)

(52) U.S. Cl.
CPC ......... *H04B 7/18506* (2013.01); *H04L 69/04* (2013.01)

(58) Field of Classification Search
CPC .. H04B 7/18506; H04L 51/063; H04L 51/066
See application file for complete search history.

(56) References Cited

U.S. PATENT DOCUMENTS

| 7,856,632 | B2 * | 12/2010 | Klingman | ............. | G06F 9/4494 |
| | | | | | 718/1 |
| 9,786,184 | B2 * | 10/2017 | La Civita | ............. | G08G 5/0013 |
| 2004/0133784 | A1 * | 7/2004 | Tonnesland | ........... | H04L 9/3247 |
| | | | | | 713/176 |
| 2005/0223384 | A1 * | 10/2005 | Klingman | ............. | G06F 9/4881 |
| | | | | | 718/107 |
| 2007/0205925 | A1 * | 9/2007 | Foster | ................ | H04B 7/18506 |
| | | | | | 341/51 |

(Continued)

FOREIGN PATENT DOCUMENTS

| JP | H08-171478 A | 7/1996 |
| JP | 2007-147528 A | 6/2007 |

(Continued)

OTHER PUBLICATIONS

Office Action Issued in Corresponding JP Application No. 2022-172286, dated Apr. 23, 2024. (8 Pages with English Translation).

*Primary Examiner* — Hoi C Lau (74) *Attorney, Agent, or Firm* — Osha Bergman Watanabe & Burton LLP (57) ABSTRACT

Provided are a data encoding device, a data transmission system, a data encoding method, and a data encoding program that can compress a data volume and transmit the compressed data without reducing the amount of information in text data. The data encoding device includes: an input unit to which text data created based on weather prediction information on a two-dimensional map is input; an encoding unit configured to encode the text data in accordance with a predetermined conversion list to create encoded text data; and a communication unit configured to transmit the encoded text data via text data communication.

8 Claims, 8 Drawing Sheets

(56) References Cited

U.S. PATENT DOCUMENTS

| | | | |
|---|---|---|---|
| 2011/0248863 A1* | 10/2011 | Johnson | H04L 67/53 |
| | | | 340/686.1 |
| 2013/0028174 A1* | 1/2013 | Cabos | H04L 51/063 |
| | | | 370/316 |
| 2014/0327547 A1* | 11/2014 | Johnson | H04L 67/53 |
| | | | 340/601 |
| 2015/0256277 A1* | 9/2015 | Johnson | G08B 27/006 |
| | | | 340/601 |
| 2016/0134682 A1* | 5/2016 | Bolling | H04B 7/18506 |
| | | | 709/217 |
| 2018/0026799 A1* | 1/2018 | Pottier | H04L 9/30 |
| | | | 713/156 |
| 2019/0206386 A1* | 7/2019 | Kirichenko | G10L 13/02 |
| 2019/0386969 A1* | 12/2019 | Verzun | G06F 21/606 |
| 2020/0194002 A1* | 6/2020 | Karpukhin | G10L 15/22 |
| 2022/0070728 A1* | 3/2022 | Stevens | H04B 7/18506 |
| 2022/0335553 A1* | 10/2022 | Chew | G06F 16/35 |
| 2023/0303266 A1* | 9/2023 | Lao | B64D 45/00 |
| 2024/0146397 A1* | 5/2024 | Nagashima | H04L 69/04 |
| 2024/0146522 A1* | 5/2024 | Lee | G06K 7/1417 |

FOREIGN PATENT DOCUMENTS

| | | |
|---|---|---|
| JP | 2010-074324 A | 4/2010 |
| JP | 2021-140685 A | 9/2021 |

* cited by examiner

| BIT | | | | HEX | 0 | 1 | 2 | 3 | 4 | 5 | 6 | 7 |
|---|---|---|---|---|---|---|---|---|---|---|---|---|
| 4 | 3 | 2 | 1 | | | | | | | | | |
| | | | | 7 | 0 | 0 | 0 | 0 | 1 | 1 | 1 | 1 |
| | | | | 6 | 0 | 0 | 1 | 1 | 0 | 0 | 1 | 1 |
| | | | | 5 | 0 | 1 | 0 | 1 | 0 | 1 | 0 | 1 |
| 0 | 0 | 0 | 0 | 0 | NUL | DLE | SP | 0 | @ | P | ` | p |
| 0 | 0 | 0 | 1 | 1 | SOH | DC1 | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENW | NAK | % | 5 | E | U | e | u |
| 0 | 1 | 1 | 0 | 6 | ACK | SYN | & | 6 | F | V | f | v |
| 0 | 1 | 1 | 1 | 7 | EL | ETB | ( | 7 | G | W | g | w |
| 1 | 0 | 0 | 0 | 8 | BS | CAN | ) | 8 | H | X | h | x |
| 1 | 0 | 0 | 1 | 9 | HT | EM | * | 9 | I | Y | i | y |
| 1 | 0 | 1 | 0 | 10 | LF | SUB | + | : | J | Z | j | z |
| 1 | 0 | 1 | 1 | 11 | VT | ESC | , | ; | K | [ | k | { |
| 1 | 1 | 0 | 0 | 12 | FF | FS | - | < | L | ¥ | l | | |
| 1 | 1 | 0 | 1 | 13 | CR | GS | . | = | M | ] | m | } |
| 1 | 1 | 1 | 0 | 14 | SOH | RS | . | > | N | ^ | n | ~ |
| 1 | 1 | 1 | 1 | 15 | SI | US | / | ? | O | _ | o | DEL |

FIG. 5

| GRAPHICAL REPRESENTATION | BINARY NUMBER REPRESENTATION | HEXADECIMAL NUMBER REPRESENTATION | ALLOCATED CHARACTER |
|---|---|---|---|
| / | 0 1 0 0 0 0 0 0 | 40 | @ |
| / | 0 1 0 0 0 0 0 1 | 41 | A |
| / | 0 1 0 0 0 0 1 0 | 42 | B |
| / | 0 1 0 0 0 0 1 1 | 43 | C |
| / | 0 1 0 0 0 1 0 0 | 44 | D |
| / | 0 1 0 0 0 1 0 1 | 45 | E |
| / | 0 1 0 0 0 1 1 0 | 46 | F |
| / | 0 1 0 0 0 1 1 1 | 47 | G |
| / | 0 1 0 0 1 0 0 0 | 48 | H |
| / | 0 1 0 0 1 0 0 1 | 49 | I |
| / | 0 1 0 0 1 0 1 0 | 4A | J |
| / | 0 1 0 0 1 0 1 1 | 4B | K |
| / | 0 1 0 0 1 1 0 0 | 4C | L |
| / | 0 1 0 0 1 1 0 1 | 4D | M |
| / | 0 1 0 0 1 1 1 0 | 4E | N |
| / | 0 1 0 0 1 1 1 1 | 4F | O |
| / | 0 1 0 1 0 0 0 0 | 50 | P |
| / | 0 1 0 1 0 0 0 1 | 51 | Q |
| / | 0 1 0 1 0 0 1 0 | 52 | R |
| / | 0 1 0 1 0 0 1 1 | 53 | S |
| / | 0 1 0 1 0 1 0 0 | 54 | T |
| / | 0 1 0 1 0 1 0 1 | 55 | U |
| / | 0 1 0 1 0 1 1 0 | 56 | V |
| / | 0 1 0 1 0 1 1 1 | 57 | W |
| / | 0 1 0 1 1 0 0 0 | 58 | X |
| / | 0 1 0 1 1 0 0 1 | 59 | Y |
| / | 0 1 0 1 1 0 1 0 | 5A | Z |
| / | 0 1 0 1 1 0 1 1 | 5B | [ |
| / | 0 1 0 1 1 1 0 0 | 5C | ¥ |
| / | 0 1 0 1 1 1 0 1 | 5D | ] |
| / | 0 1 0 1 1 1 1 0 | 5E | ^ |
| / | 0 1 0 1 1 1 1 1 | 5F | _ |
| / | 0 1 1 0 0 0 0 0 | 60 | ` |
| / | 0 1 1 0 0 0 0 1 | 61 | a |
| / | 0 1 1 0 0 0 1 0 | 62 | b |
| / | 0 1 1 0 0 0 1 1 | 63 | c |
| / | 0 1 1 0 0 1 0 0 | 64 | d |
| / | 0 1 1 0 0 1 0 1 | 65 | e |
| / | 0 1 1 0 0 1 1 0 | 66 | f |
| / | 0 1 1 0 0 1 1 1 | 67 | g |
| / | 0 1 1 0 1 0 0 0 | 68 | h |
| / | 0 1 1 0 1 0 0 1 | 69 | i |
| / | 0 1 1 0 1 0 1 0 | 6A | j |
| / | 0 1 1 0 1 0 1 1 | 6B | k |
| / | 0 1 1 0 1 1 0 0 | 6C | l |
| / | 0 1 1 0 1 1 0 1 | 6D | m |
| / | 0 1 1 0 1 1 1 0 | 6E | n |
| / | 0 1 1 0 1 1 1 1 | 6F | o |
| / | 0 1 1 1 0 0 0 0 | 70 | p |
| / | 0 1 1 1 0 0 0 1 | 71 | q |
| / | 0 1 1 1 0 0 1 0 | 72 | r |
| / | 0 1 1 1 0 0 1 1 | 73 | s |
| / | 0 1 1 1 0 1 0 0 | 74 | t |
| / | 0 1 1 1 0 1 0 1 | 75 | u |
| / | 0 1 1 1 0 1 1 0 | 76 | v |
| / | 0 1 1 1 0 1 1 1 | 77 | w |
| / | 0 1 1 1 1 0 0 0 | 78 | x |
| / | 0 1 1 1 1 0 0 1 | 79 | y |
| / | 0 1 1 1 1 0 1 0 | 7A | z |
| / | 0 1 1 1 1 0 1 1 | 7B | { |
| / | 0 1 1 1 1 1 0 0 | 7C | | |
| / | 0 1 1 1 1 1 0 1 | 7D | } |
| / | 0 1 1 1 1 1 1 0 | 7E | ~ |
| / | 0 1 1 1 1 1 1 1 | 7F |  |

DATA ENCODING DEVICE, DATA TRANSMISSION SYSTEM, DATA ENCODING METHOD, AND DATA ENCODING PROGRAM

CROSS-REFERENCE TO RELATED APPLICATIONS

This application claims foreign priority benefits under U.S.C. § 119 to Japanese Patent Application No. 2022-172286 filed on Oct. 27, 2022, the contents of which is hereby incorporated by reference in its entirety.

BACKGROUND

1. Technical Field

The present disclosure relates to a data encoding device, a data transmission system, a data encoding method, and a data encoding program.

2. Description of Related Art

In data transmission, schemes to compress and transmit data have been considered. In particular, since data transmission between a facility on the ground and an aircraft is performed through communication via a dedicated communication facility or a satellite, it is required to reduce the data amount. In general, data transmission between a facility on the ground and an aircraft is transmission performed in text data using text data communication. The art of U.S. Patent Application Publication No. 2016/0134682 discloses that a data file is converted into a text, and text data communication is used to transmit the text. Further, the art of U.S. Patent Application Publication No. 2022/0070728 discloses that text data communication is assumed, and a transmission volume is compressed for the text data communication. Further, the art of U.S. Patent Application Publication No. 2007/0205925 discloses that, for ASCII code expressed in 8 bits, the number of bits can be reduced assuming use as a character string, and thereby the data is compressed.

In the arts of U.S. Patent Application Publication No. 2016/0134682, U.S. Patent Application Publication No. 2022/0070728, and U.S. Patent Application Publication No. 2007/0205925, however, information such as image data is unable to be transmitted as it stands and can be transmitted after the information is re-expressed by using the ASCII art or the like, and this causes a problem of a limited amount of information to be transmitted to a destination.

Further, since information is packaged and transmitted at a sender by forming a word or a text by character strings, there is a problem of an increased volume of communication proportional to the amount of information that can be transmitted.

Furthermore, since communication between a facility on the ground and an aircraft is performed via a dedicated communication facility or a satellite as described above, the volume of transmission is restricted compared to communication between facilities on the ground, and the communication cost is significantly higher.

BRIEF SUMMARY

The present disclosure has been made in view of such circumstances, and an object is to provide a data encoding device, a data transmission system, a data encoding method, and a data encoding program that can compress a data volume and transmit the compressed data without reducing the amount of information in text data.

To achieve the above object, a data encoding device, a data transmission system, a data encoding method, and a data encoding program of the present disclosure employ the following solutions.

A data encoding device of the present disclosure includes: an input unit to which text data created based on weather prediction information on a two-dimensional map is input; an encoding unit configured to encode the text data in accordance with a predetermined conversion list to create encoded text data; and a communication unit configured to transmit the encoded text data via text data communication.

A data transmission system of the present disclosure includes: the data encoding device described previously; and a data decoding device, and the data decoding device includes a transceiver unit configured to receive the encoded text data from the data encoding device via text data communication, a decoding unit configured to decode the encoded text data in accordance with the predetermined conversion list, and an output unit configured to output the decoded text data.

A data encoding method of the present disclosure performed by a computer, and the data encoding method includes: an input step of text data created based on weather prediction information on a two-dimensional map being input; an encoding step of encoding the text data in accordance with a predetermined conversion list to create encoded text data; and a communication step of transmitting the encoded text data via text data communication.

A data encoding program of the present disclosure is a program that causes a computer to perform the data encoding method described previously.

According to the data encoding device of the present disclosure, the data volume can be compressed without a reduction in the amount of information in text data. Thus, the communication charge during data transmission can be suppressed.

DETAILED DESCRIPTION

One embodiment of a data encoding device, a data transmission system, a data encoding method, and a data encoding program according to the present disclosure will be described below with reference to the drawings.

A first embodiment of the present disclosure will be described below with reference to FIG. 1.

First Embodiment

Figure 1:
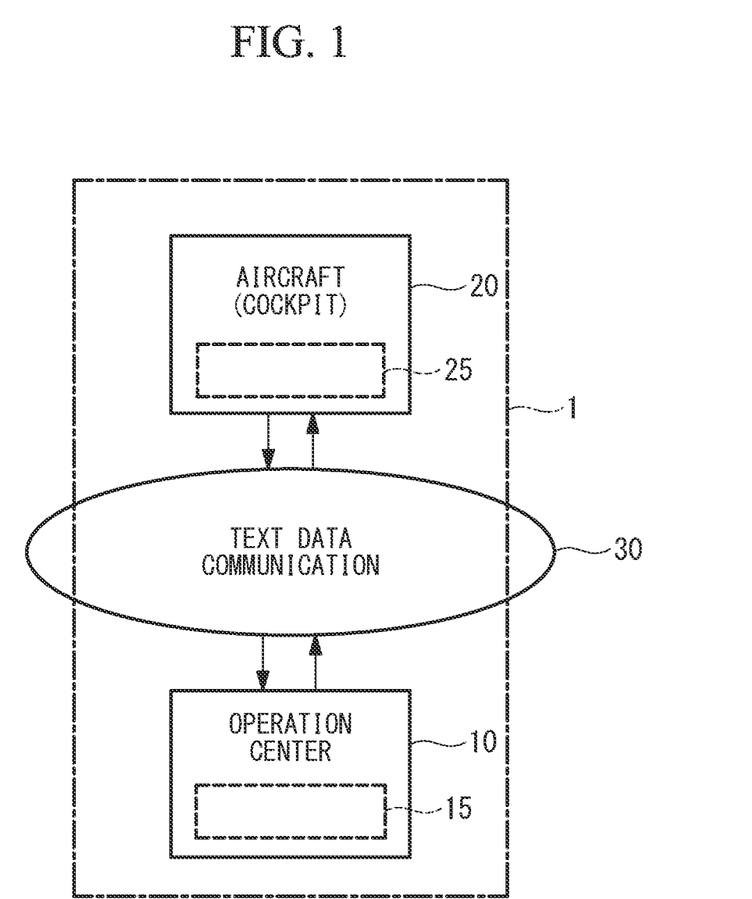
FIG. 1 is a schematic drawing of a data transmission system in some embodiments of the present disclosure.

FIG. 1 is a schematic diagram of a data transmission system in some embodiments of the present disclosure.

A data transmission system 1 is a system provided to an operation center 10 on the ground and to an aircraft 20, for example. In FIG. 1, the data transmission system 1 is indicated by a one-dot chain line for the purpose of illustration. The data transmission system 1 is implemented by a data encoding device 15 of the operation center 10 and a data decoding device 25 of the aircraft 20. The data transmission system 1 is used for transmission between the operation center 10 on the ground and the aircraft 20 in the present embodiment, however, may be used for transmission between centers on the ground or transmission between aircrafts, and the place where transmission is performed is not limited.

The data encoding device 15 of the operation center 10 encodes input data and transmits the data to the data decoding device 25 of the aircraft 20 via text data communication 30 prepared by a communication service provider.

The data decoding device 25 of the aircraft 20 decodes and outputs data transmitted from the data encoding device 15. Similarly, the data decoding device 25 can also decode data and transmit the data to the data encoding device 15 via the text data communication 30. The data encoding device 15 decodes and outputs data.

Data input to the data encoding device 15 is data expressing an image or the like by text data. For example, the data may be a figure, a graph, or the like expressed in the ASCII art using a text.

The text data communication 30 is an Aircraft Communication Addressing and Reporting System (ACARS, a datalink system for transmitting a short message wirelessly or via a satellite) mounted to almost all the aircraft 20, for example. The text data communication 30 may be any communication as long as it can transmit text data, such as Controller-Pilot Data Link Communications (CPDLC), and the type thereof is not limited.

Figure 2:
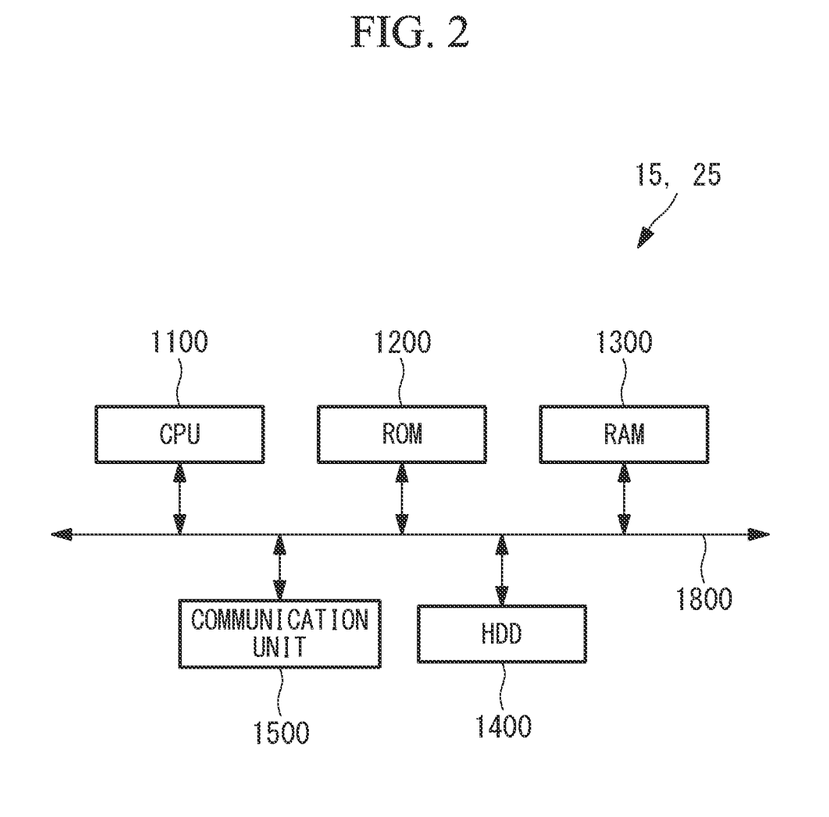
FIG. 2 is a diagram illustrating an example of the hardware configuration of a data transmission system in some embodiments of the present disclosure.

FIG. 2 is a diagram illustrating an example of a hardware configuration of the data transmission system in some embodiments of the present disclosure.

As illustrated in FIG. 2, the data encoding device 15 and the data decoding device 25 of the data transmission system 1 are computer systems (computing systems), respectively, and each include a central processing unit (CPU: processor) 1100, a secondary storage device (ROM, secondary storage: memory) 1200, a main memory device (RAM, main memory) 1300, a hard disk drive (HDD) 1400 as a large capacity storage device, and a communication unit 1500 for connecting to a network or the like, for example. Note that a solid state drive (SSD) may be used as the large capacity storage device. These units are connected to each other via a bus 1800.

The CPU 1100 controls the overall data encoding device 15 and the data decoding device 25 by operating system (OS) stored in the secondary storage device 1200 connected via the bus 1800 and performs various processes by executing various programs stored in the secondary storage device 1200, for example. One or a plurality of CPUs 1100 are provided and may cooperate with each other to implement processes.

The main memory device 1300 is formed of a rewritable memory such as a cache memory, a random access memory (RAM), for example, and is used as a working area where the execution program of the CPU 1100 is read or loaded, processing data caused by the execution program is written, or the like.

The secondary storage device 1200 is a non-transitory computer readable storage medium. For example, the secondary storage device 1200 is a magnetic disk, a magneto-optical disk, a CD-ROM, a DVD-ROM, a semiconductor memory, or the like. Examples of the secondary storage device 1200 may be a read only memory (ROM), a hard disk drive (HDD), a solid state drive (SSD) flash memory, or the like. For example, the secondary storage device 1200 stores OS used for controlling the overall information processing device, such as Windows (registered trademark), iOS (registered trademark), Android (registered trademark), or the like, Basic Input/Output System (BIOS), various device driver used for hardware operations of peripheral devices, various application software, various data or files, and the like. Further, programs for implementing various processes or various data required for implementing various processes are stored in the secondary storage device 1200. A plurality of secondary storage devices 1200 may be provided, and the programs or the data as described above may be divided and stored in each of the secondary storage devices 1200.

The data encoding device 15 and data decoding device 25 may further include an input unit formed of a keyboard, a mouse, or the like, a display unit formed of a liquid crystal display device or the like that display data, or the like. Furthermore, the data encoding device 15 and data decoding device 25 may include a notification unit including an indicator unit such as a lamp and a speaker that outputs a sound, in particular, an alarm sound.

The data transmission system 1 may be formed of a plurality of computer systems as described above.

Figure 3:
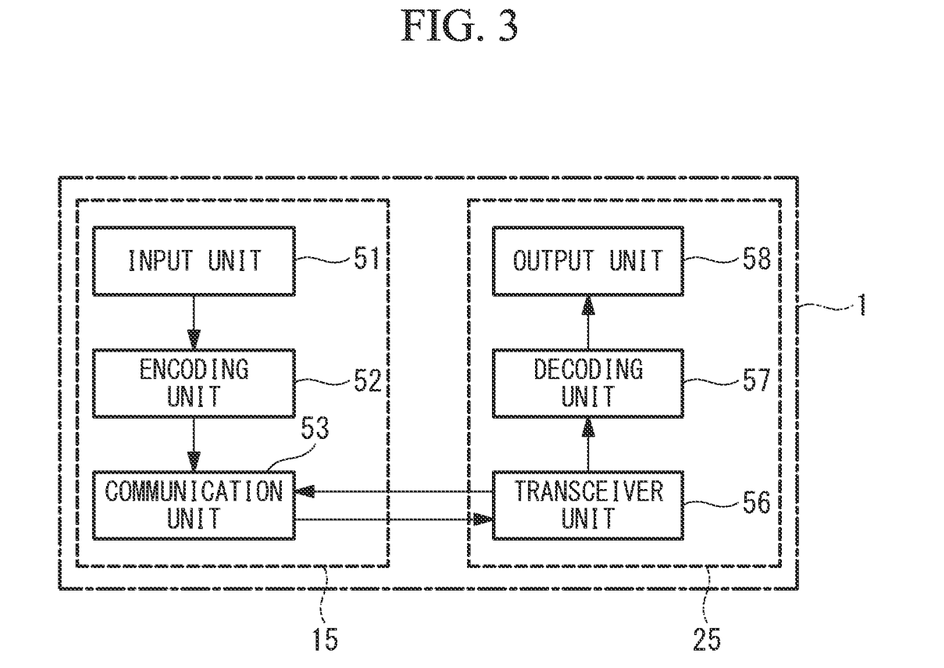
FIG. 3 is a diagram illustrating an example of the function of a data transmission system in some embodiments of the present disclosure.

FIG. 3 is a diagram illustrating an example of functions of the data transmission system in some embodiments of the present disclosure.

As illustrated in FIG. 3, the data transmission system 1 includes the data encoding device 15 and the data decoding device 25. The data encoding device 15 includes an input unit 51, an encoding unit 52, and a communication unit 53. The data decoding device 25 includes a transceiver unit 56, a decoding unit 57, and an output unit 58.

A series of processes for implementing the functions of the data transmission system 1 is stored in the secondary storage device 1200 (see FIG. 2) or the like in a form of a program as an example, and various functions are implemented when the CPU (processor) 1100 (see FIG. 2) loads the program into the main memory device 1300 (see FIG. 2) and performs processing and computation of information. Note that the program may be a program to which a form of being preinstalled in the secondary storage device 1200, a form of being provided in a state of being stored in another non-transitory computer readable storage medium, a form of being delivered via a wired or wireless communication scheme, or the like may be applied. An example of the non-transitory computer readable storage medium may be a magnetic disk, a magneto-optical disk, a CD-ROM, a DVD-ROM, a semiconductor memory, or the like.

The input unit 51 illustrated in FIG. 3 takes text data from a user or an external system (not illustrated) as input. As described above, input text data is a figure or a graph expressed by the ASCII art using a text, for example.

In the present embodiment, weather prediction information is aircraft lightning strike probable area information, for example, and text data is created based on the aircraft lightning strike probable area information in which the level of an expected aircraft lightning strike probability is indicated on a map. Based on the aircraft lightning strike probable area information, a level of an expected aircraft lightning strike probability and a location are associated with each other, and a aircraft lightning probable area detection two-dimensional map is used as text data by using the ASCII art. In the aircraft lightning probable area detection two-dimensional map, binary representation is used for expressing a safe area that is a region where the expected aircraft lightning strike probability is low and no lightning strike is expected and a dangerous area that is a region where the expected aircraft lightning strike probability is high and a lightning strike is expected. For example, in the present embodiment, binary values are used such that the safe area is expressed by blank, and the dangerous area is expressed by "I" (thrush). The expected aircraft lightning strike probability corresponding to the boundary between the safe area and the dangerous area may be changeable.

The encoding unit 52 encodes text data input from the input unit 51 in accordance with a predetermined conversion list to create encoded text data.

Figure 4:
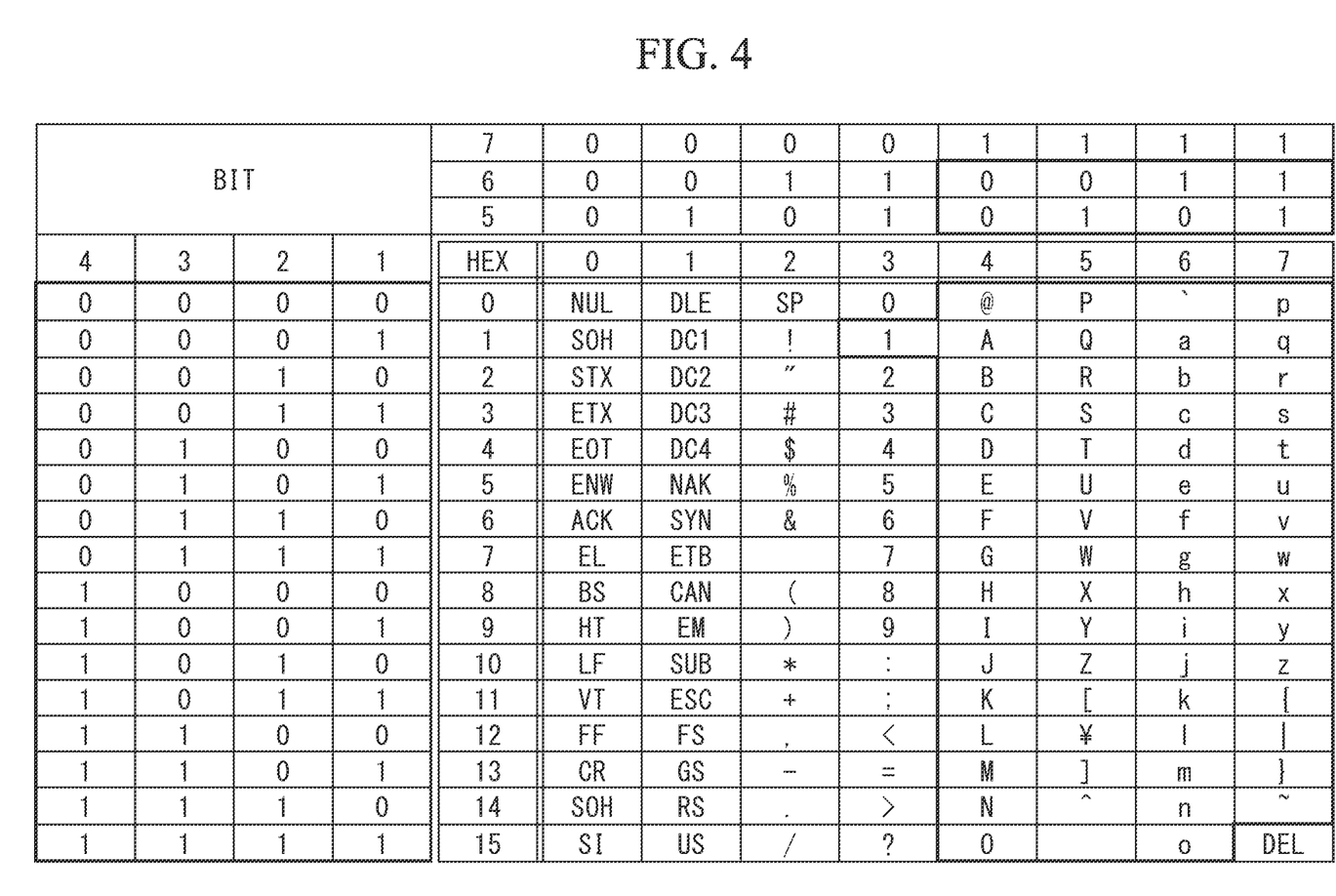
FIG. 4 is a diagram illustrating an ASCII code correspondence table in some embodiments of the present disclosure.

FIG. 4 illustrates an ASCII code correspondence table in some embodiments of the present disclosure.

In FIG. 4, "HEX" represents correspondence between ASCII codes and hexadecimal numbers, and "BIT" represents correspondence between ASCII codes and seven bits of 1 to 7 bits.

In the present embodiment, 64 characters surrounded by bold lines in FIG. 4 are used out of the ASCII codes. Use of these characters can express 6 bits surrounded by bold lines out of the corresponding bits. For example, "A" of the ASCII code represents "000100". It is defined that "DEL" of the ASCII code is not used, and "1" instead of "DEL" is used to represent "111111".

In such a way, the predetermined conversion list in the present embodiment is a conversion table in which 6 bits are expressed in the ASCII code.

Figure 5:
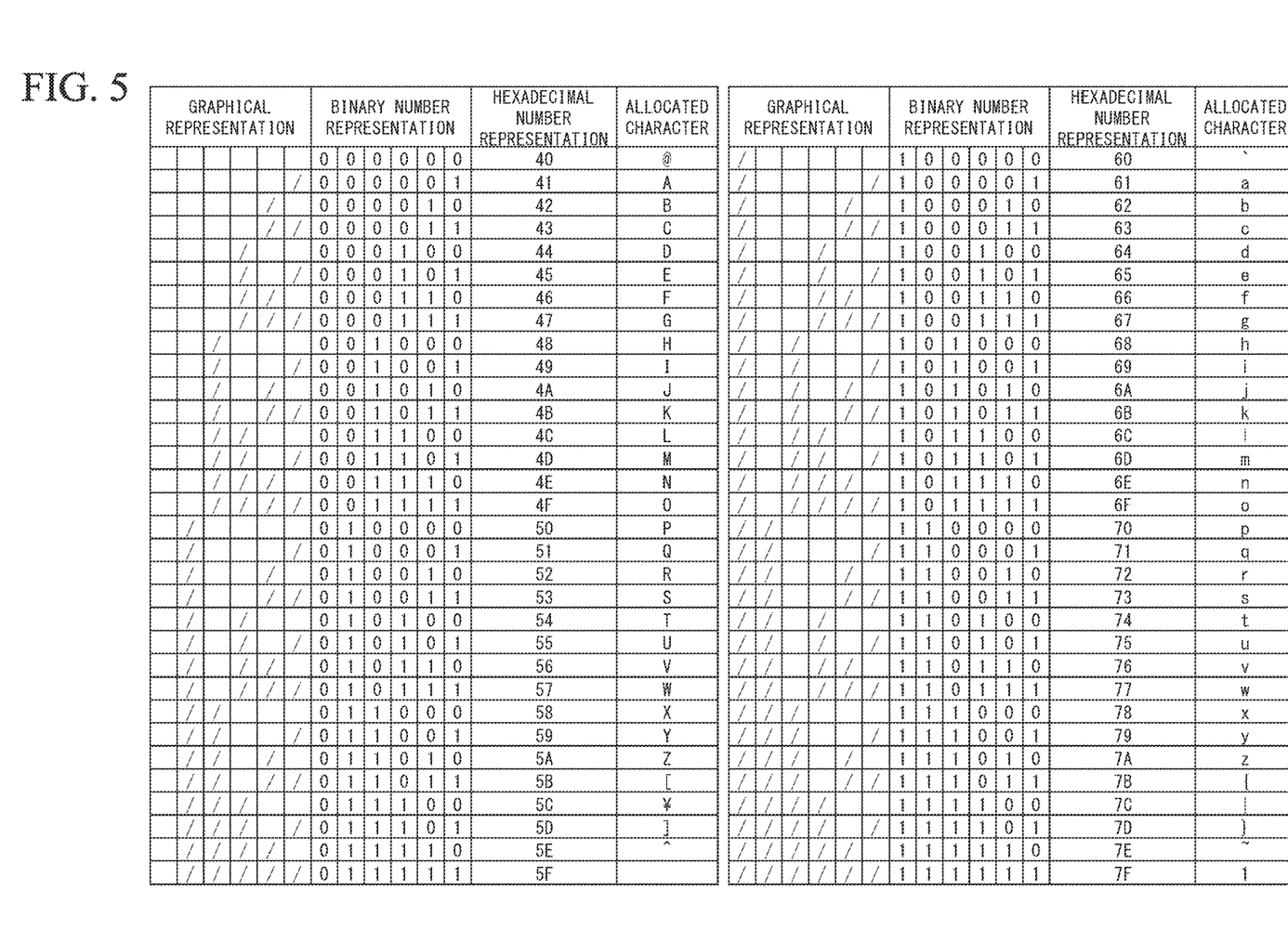
FIG. 5 is a diagram illustrating a predetermined conversion list in some embodiments of the present disclosure.

FIG. 5 illustrates a predetermined conversion list in some embodiments of the present disclosure.

In FIG. 5, "graphical representation" expresses figures or graphs expressed in the ASCII art in text data such as a aircraft lightning probable area detection two-dimensional map. "Binary number representation" expresses graphical representations by binary numbers, and expresses binary number representations of 6 bits illustrated in FIG. 4. "Hexadecimal number representation" expresses hexadecimal numbers corresponding to binary number representations. "Allocated character" represents ASCII codes corresponding to binary number representations. Since the aircraft lightning probable area detection two-dimensional map of the present embodiment is text data expressed by binary representations, graphical representation can be expressed in binary numbers.

When a graphical representation is included in text data input from the input unit 51, the encoding unit 52 divides the text data into six characters each, converts each six-character into an ASCII code corresponding to characters allocated from binary number representations of six characters in accordance with a predetermined conversion list illustrated in FIG. 5, and encodes the text data.

Figure 6:
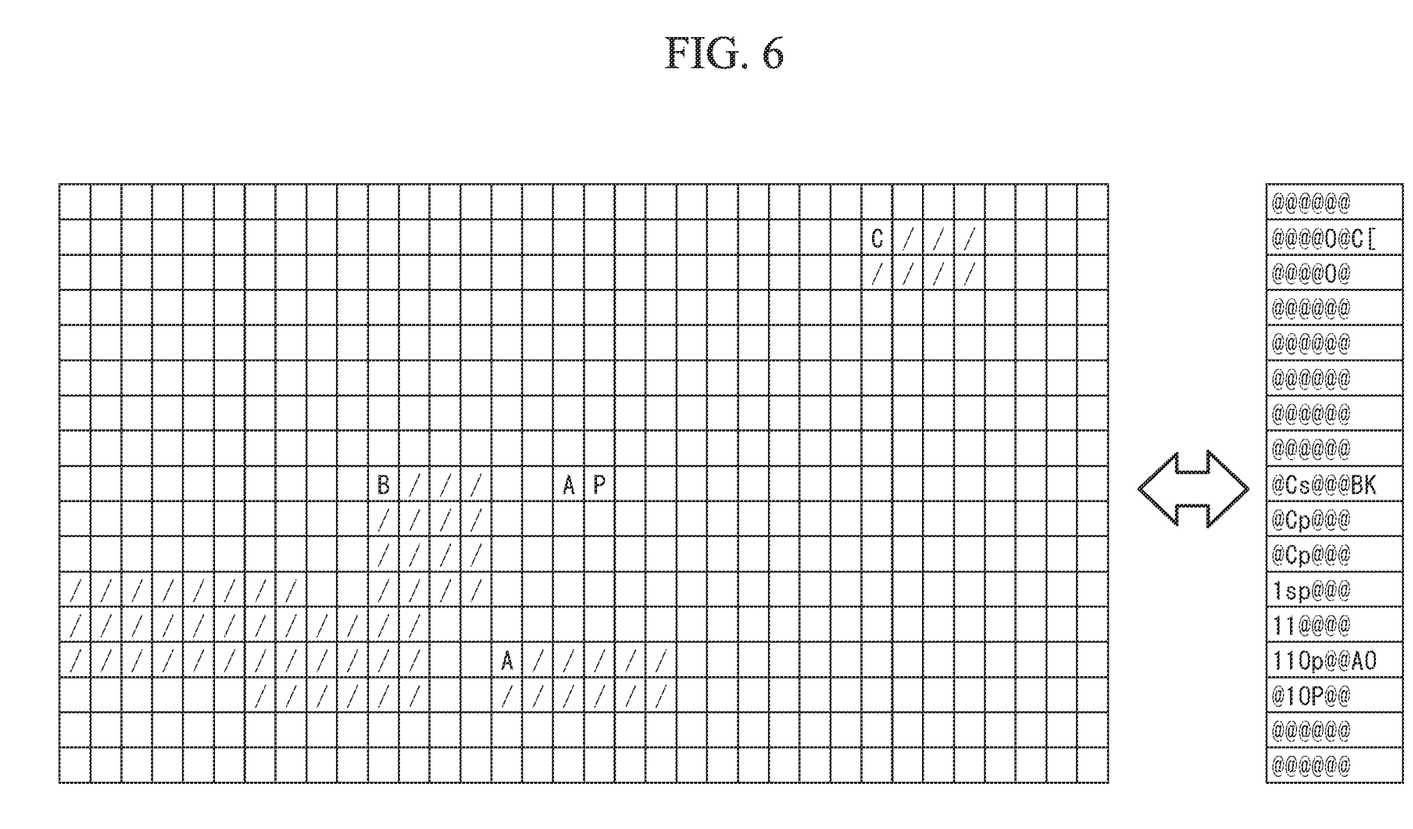
FIG. 6 is a diagram illustrating encoding and decoding of text data in some embodiments of the present disclosure.

FIG. 6 illustrates encoding and decoding of text data in some embodiments of the present disclosure.

In FIG. 6, the left text data indicates text data that is a aircraft lightning probable area detection two-dimensional map, and the right data indicates text data that has been converted and encoded from text data that is the aircraft lightning probable area detection two-dimensional map. In the text data that is a aircraft lightning probable area detection two-dimensional map, "AP" represents an airport where the aircraft 20 is planned to land, and "I" expresses a region where a lightning strike is expected around the airport. Further, "A", "B", and "C" are predefined characters indicating a aircraft lightning probable area detection altitude in a region that is expressed by "I" to which each of the characters is adjacent and where a lightning strike is expected.

The encoding unit 52 performs encoding text data input from the input unit 51 row by row. On the first row, since 34 characters are all 0 when expressed in binary numbers, "@" is allocated to every six bits (six characters), and the 34 characters are encoded into "@@@@@@". Note that a portion shorter than six characters (6 bits) (the last two characters in the case of the present embodiment) is converted as 0, for example.

On the second row of the text data, since first to 26th characters are all 0, first to 24th characters are converted into "@@@@" for every six bits. The next six characters are "001111" and are thus converted into "O" in accordance with the predetermined conversion list of FIG. 5. The remaining four characters are "0000" and are thus converted into "@". Therefore, the second row is encoded to "@@@@O@". Note that the 27th character on the second row of the text data is "C". When a character not included in the predetermined conversion list is present in such a way, the character of interest and the position at which the character of interest is displayed (in this case, 27th character) are appended to the encoded text data on the row in accordance with the predetermined conversion list. Therefore, "C" and "[" that expresses 27 are appended, and thereby the second row of the text data is encoded to "@@@@O@C[".

In such a way, the encoding unit 52 encodes all the rows of text data in accordance with a predetermined conversion list to created encoded text data. Note that, since it is defined that "AP" representing an airport is always displayed at the center of text data in the present embodiment, "AP" is not included in encoded text data.

The communication unit 53 transmits encoded text data created by the encoding unit 52 to the data decoding device 25 via the text data communication 30 (ACARS).

On the other hand, the transceiver unit 56 of the data decoding device 25 receives encoded text data transmitted from the data encoding device 15 via the text data communication 30.

The decoding unit 57 decodes encoded text data received by the transceiver unit 56 back to the original text data in accordance with the predetermined conversion list of FIG. 5. The decoding unit 57 acquires the encoded text data indicated on the right side in FIG. 6. The decoding unit 57 converts the ASCII code into a graphical representation row by row in accordance with the predetermined conversion list of FIG. 5. That is, the decoding unit 57 performs conversion opposite to the encoding unit 52 of the data encoding device 15 and thereby decodes the encoded text data back to the text data.

The output unit 58 outputs text data decoded by the decoding unit 57. The output unit 58 may select any output methods such as output from a printer provided to a cockpit, output to a display provided to the cockpit, output to a mobile terminal such as a tablet device, or the like.

Next, the operation of the data transmission system in some embodiments of the present disclosure will be described with reference to the drawings.

Figure 7:
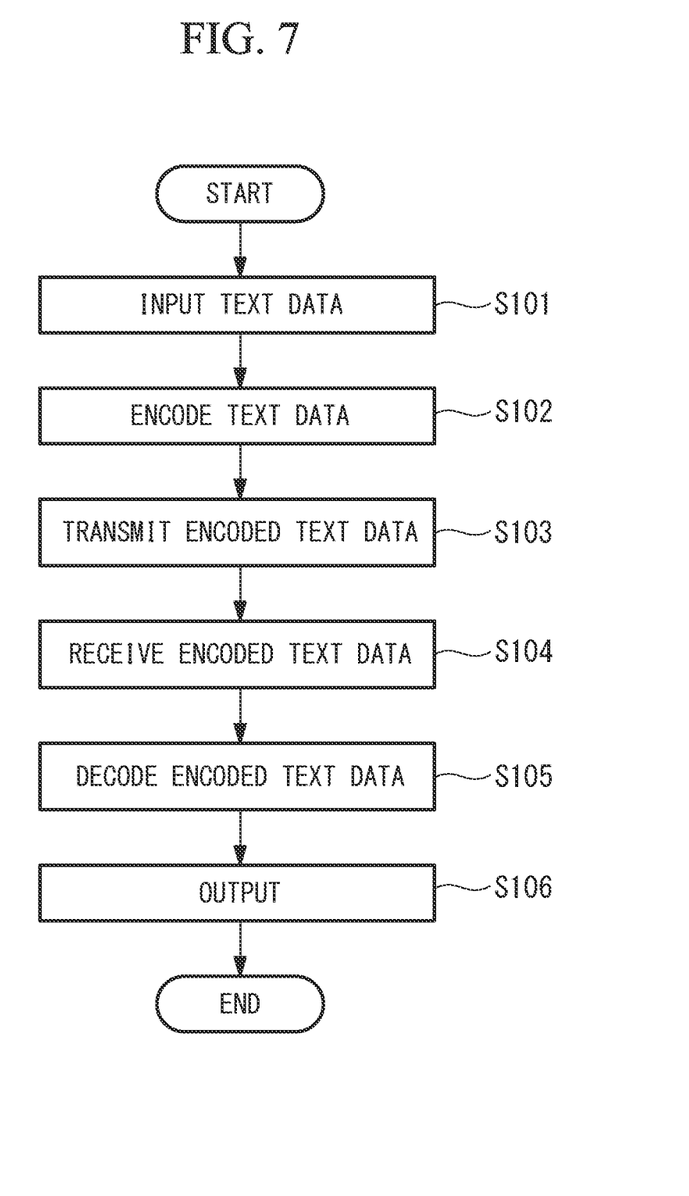
FIG. 7 is a control flow of the data transmission system in some embodiments of the present disclosure.

FIG. 7 illustrates a control flow of the data transmission system in some embodiments of the present disclosure.

In step S101, text data is input to the input unit 51 of the data encoding device 15 of the operation center 10.

In step S102, the encoding unit 52 encodes the text data in accordance with a predetermined conversion list to convert the text data into encoded text data.

In step S103, the communication unit 53 transmits the encoded text data to the data decoding device 25 of the aircraft 20 via the text data communication 30.

In step S104, the transceiver unit 56 of the data decoding device 25 of the aircraft 20 receives the encoded text data.

In step S105, the decoding unit 57 decodes the encoded text data in accordance with the predetermined conversion list to convert the encoded text data into text data.

In step S106, the output unit 58 outputs the text data.

Second Embodiment

While text data is a aircraft lightning probable area detection two-dimensional map created by using aircraft lightning strike probable area information in the first embodiment, the text data is a wind prediction distribution created by using wind prediction information that is weather prediction information in the present embodiment. Since other features are the same as those in the first embodiment, the same configurations are labeled with the same reference, and the description thereof will be omitted.

Figure 8:
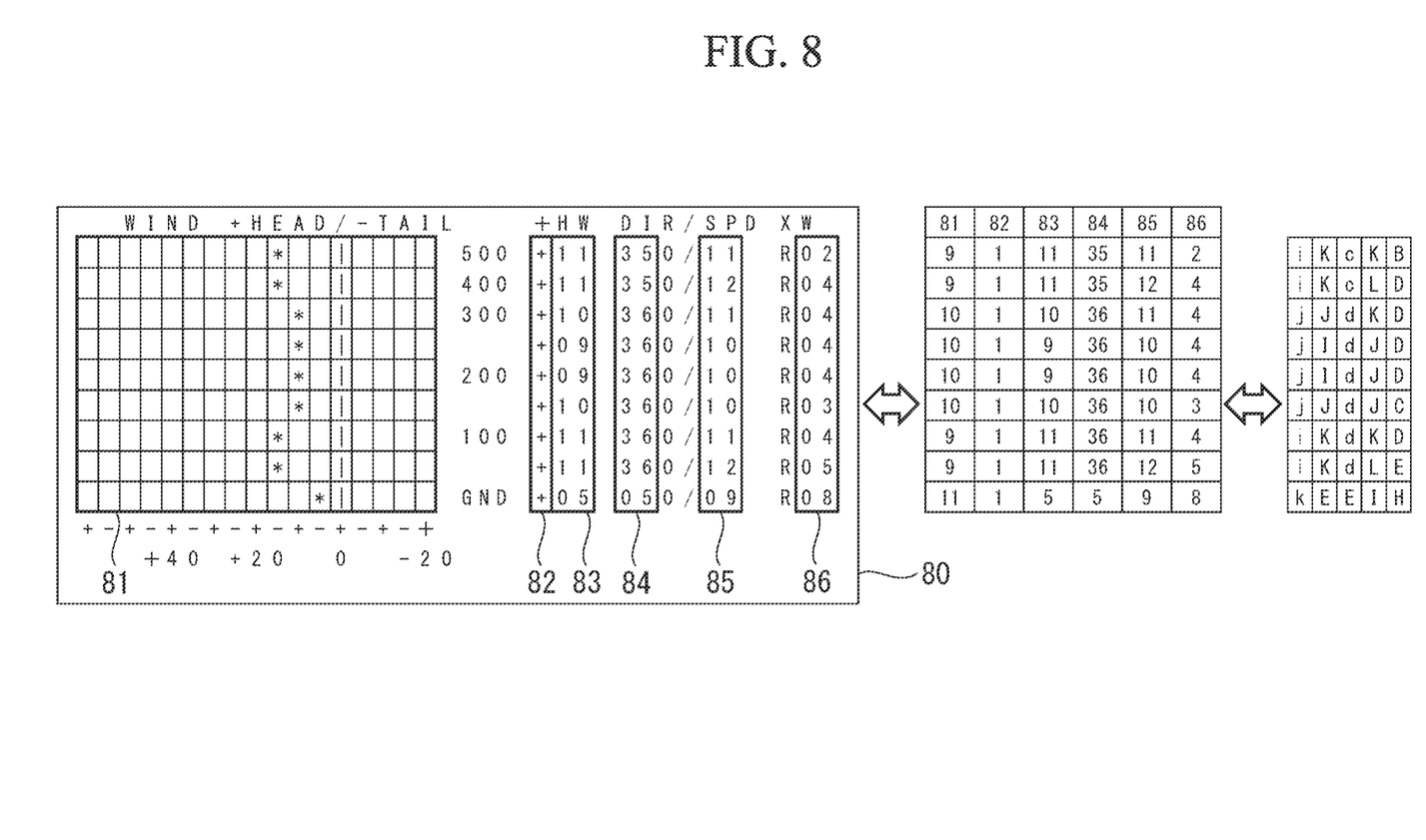
FIG. 8 is a diagram illustrating encoding and decoding of text data in some embodiments of the present disclosure.

FIG. 8 illustrates encoding and decoding of text data in some embodiments of the present disclosure.

In FIG. 8, the left text data indicates text data that is a wind prediction distribution 80, the center text data indicates text data in which only a variable text excluding a fixed text is extracted out of the wind prediction distribution 80, and the right text data indicates encoded text data in which the text data extracted out of the wind prediction distribution 80 is converted and encoded. For the wind prediction distribution 80, Airport Low-level Wind INformation) (ALWIN) is used, for example.

In text data that is the wind prediction distribution 80, a map 81 indicates vertically the altitude and horizontally the normalized wind velocity in the head direction to the tail direction of the aircraft 20. For the altitude of the map 81, the bottom indicates GND at altitude 0 and the top indicates altitude 500, as illustrated on the right side of the map 81. Symbols "*" in the map 81 represent a distribution of wind velocities in the head direction or the tail direction with respect to "|" as zero, as illustrated below the map 81. Items 82 to 86 indicate information corresponding to respective altitudes of the map 81. Each altitude corresponds to each row. The item 82 indicates the wind direction and indicates a wind from the head direction by "+" and a wind from the tail direction by "−". The item 83 indicates the normalized wind velocity. The item 84 indicates the wind direction. The item 85 indicates the wind velocity. The item 86 indicates the wind velocity of a cross wind. The letter "R" written on the left side of the item 86 is to indicate the direction of a cross wind, which may be "L" or "R", and is not included in a variable text used for transmission and reception because this can be determined from the wind direction of the item 84. In the present text data, each text of the map 81 and the items 82 to 86 is a variable text, which is a text excluding fixed text, and is extracted by the encoding unit 52. Therefore, a variable text extracted by the encoding unit 52 has 26 digits per row.

The map 81 has a display width of 17 digits, which can be expressed in 5 bits in the present embodiment. When expressed in 5 bits, the map 81 is expressed by the number of columns from the column immediately left to the position of "*" to the end. The items 82 and 83 have numerical ranges of normalized wind velocities ranging from "−20" to "+60", which can be expressed in 1 code bit and 6 numerical bits. The item 84 has a numerical range of angles ranging from "0" to "+36" (ranging from 0 degree to 360 degrees), which can be expressed in 6 bits. The item 85 has a numerical range of wind velocities ranging from "0" to "+60", which can be expressed in 6 bits. The item 86 has a numerical range of wind velocities of a cross wind ranging from "0" to "+60", which can be expressed in 6 bits.

The encoding unit 52 encodes text data (variable text) in accordance with the predetermined conversion list of FIG. 5 and converts the text data into encoded text data. The converted encoded text data is the text data on the right side in FIG. 8. In such a way, 26 digits of the text data can be compressed into 5 digits in volume.

As described above, according to the data encoding device 15 of the present embodiment, since text data is encoded in accordance with a predetermined conversion list, the data volume can be compressed without a reduction in the amount of information in the text data. Thus, a communication charge during data transmission can be suppressed. Further, since the converted encoded text data is text data, a facility for text data communication can be used, and therefore, the cost for an additional facility can be suppressed.

Although the data decoding device 25 receives encoded text data encoded by the data encoding device 15 and decodes the received encoded text data back to text data in some embodiments of the present disclosure, the data decoding device 25 may encode text data by using a predetermined conversion list to create encoded text data and transmit the created encoded text data to the data encoding device 15. Further, the data encoding device 15 may receive encoded text data transmitted by the data decoding device 25 and decode the received encoded text data back to text data.

[Supplementary Note]

The data encoding device, the data transmission system, the data encoding method, and the data encoding program in the embodiments described above are understood as follows, for example.

A data encoding device (15) according to the first aspect of the present disclosure includes: an input unit (51) to which text data created based on weather prediction information on a two-dimensional map is input; an encoding unit (52) configured to encode the text data in accordance with a predetermined conversion list to create encoded text data; and a communication unit (53) configured to transmit the encoded text data via text data communication (30).

Since text data is encoded in accordance with a predetermined conversion list, the data volume can be compressed without a reduction in the amount of information in the text data. Thus, a communication charge during data transmission can be suppressed. Further, since the converted encoded text data is text data, a facility for text data communication can be used, and therefore, the cost for an additional facility can be suppressed.

In the data encoding device according to the second aspect of the present disclosure, in the first aspect, the text data may include a character string expressing a figure.

Since the text data including a character string expressing a figure is used, it is possible to employ not only representation with a character string but also representation with a figure using the ASCII art, and this enables the receiving side to easily understand information.

In the data encoding device according to the third aspect of the present disclosure, in the first aspect or the second aspect, the weather prediction information may include aircraft lightning strike probable area information indicating a level of an expected aircraft lightning strike probability, and the text data may be a aircraft lightning probable area detection two-dimensional map created by using the aircraft lightning strike probable area information to associate the level of the expected aircraft lightning strike probability with a location.

Since the text data expressing a aircraft lightning probable area detection two-dimensional map by character strings expressing a figure is used, the receiving side can easily understand the aircraft lightning strike probable area information.

In the data encoding device according to the fourth aspect of the present disclosure, in the third aspect, the aircraft lightning probable area detection two-dimensional map may be the text data expressed by binary representation of a safe area that is a region where the expected aircraft lightning strike probability is 0 and a dangerous area that is a region where the expected aircraft lightning strike probability is greater than 0.

Because the aircraft lightning probable area detection two-dimensional map is expressed in binary values for a dangerous area and a safe area, a character string expressing a figure can be expressed in one bit.

In the data encoding device according to the fifth aspect of the present disclosure, in the first aspect or the second aspect, the weather prediction information may include wind prediction information indicating wind information including a wind direction and a wind velocity, and the text data may be a wind prediction distribution created by using the wind prediction information to associate the wind direction and the wind velocity with a location.

Since the text data that expresses a wind prediction distribution by character strings that expresses a figure is used, the receiving side can easily understand the wind prediction information.

In the data encoding device according to the sixth aspect of the present disclosure, in any one of the first aspect to the fifth aspect, the encoding unit may convert a plurality of character strings of the text data into one character in accordance with the predetermined conversion list and encode the one character.

Since a plurality of character strings of text data are converted into one character and encoded, the text data can be efficiently compressed.

A data transmission system (1) according to the seventh aspect of the present disclosure includes: the data encoding device according to any one of the first aspect to the sixth aspect; and a data decoding device (25), and the data decoding device includes a transceiver unit (56) configured to receive the encoded text data from the data encoding device via text data communication, a decoding unit (57) configured to decode the encoded text data in accordance with the predetermined conversion list, and an output unit (58) configured to output the decoded text data.

In the data transmission system according to the eighth aspect of the present disclosure, in the seventh aspect, the data decoding device may be provided to an aircraft (20).

Since the decoding device is provided to an aircraft, a text data communication system provided to the aircraft can be used to externally transmit and receive text data. Typically, communication charges are high for communication between a facility on the ground and aircrafts, however, the data volume is suppressed, and therefore, communication charges can be suppressed.

A data encoding method (15) according to the ninth aspect of the present disclosure performed by a computer includes: an input step of taking, as input, text data created based on weather prediction information on a two-dimensional map; an encoding step of encoding the text data in accordance with a predetermined conversion list to create encoded text data; and a communication step of transmitting the encoded text data via text data communication.

A data transmission program (15) according to the tenth aspect of the present disclosure is a program that causes a computer to perform the data encoding method according to the ninth aspect.

LIST OF REFERENCE SYMBOLS

1 data transmission system
10 operation center
15 data encoding device
20 aircraft
25 data decoding device
30 text data communication
51 input unit
52 encoding unit
53 communication unit
56 transceiver unit
57 decoding unit
58 output unit
1100 CPU
1200 secondary storage device
1300 main memory device
1400 hard disk drive
1500 communication unit
1800 bus

What is claimed is:

1. A data transmission system comprising:
a data encoding device comprising:
an input unit to which text data is input, wherein the text data is created based on weather prediction information on a two-dimensional map and includes a character string expressing a figure expressed in an ASCII art using text;
an encoding unit configured to encode the text data in accordance with a predetermined conversion list to create encoded text data; and
a communication unit configured to transmit the encoded text data via text data communication; and
a data decoding device comprising:
a transceiver unit configured to receive the encoded text data from the data encoding device via text data communication;
a decoding unit configured to decode the encoded text data in accordance with the predetermined conversion list; and
an output unit configured to output the decoded text data.

2. The data transmission system according to claim 1, wherein
the weather prediction information includes aircraft lightning strike probable area information indicating a level of an expected aircraft lightning strike probability, and
the text data is an aircraft lightning probable area detection two-dimensional map created by using the aircraft lightning strike probable area information to associate the level of the expected aircraft lightning strike probability with a location.

3. The data transmission system according to claim 2, wherein the aircraft lightning probable area detection two-dimensional map is the text data expressed in binary representation of a safe area that is a region where the expected aircraft lightning strike probability is low and a dangerous area that is a region where the expected aircraft lightning strike probability is high.

4. The data transmission system according to claim 1, wherein
the weather prediction information includes wind prediction information indicating wind information including a wind direction and a wind velocity, and
the text data is a wind prediction distribution created by using the wind prediction information to associate the wind direction and the wind velocity with a location.

5. The data transmission system according to claim 1, wherein the encoding unit converts a plurality of character strings of the text data into one character in accordance with the predetermined conversion list and encodes the one character.

6. The data transmission system according to claim 1, wherein the data decoding device is provided to an aircraft.

7. A data transmission method performed by a computer, comprising:
inputting text data that is created based on weather prediction information on a two-dimensional map and that includes a character string expressing a figure expressed in an ASCII art using a text;
encoding the text data in accordance with a predetermined conversion list to create encoded text data;
transmitting the encoded text data via text data communication;
receiving the encoded text data via the text data communication;
decoding the encoded text data in accordance with the predetermined conversion list; and
outputting the decoded text data.

8. A non-transitory tangible computer-readable storage medium storing a program for causing a computer to perform the data transmission method according to claim 7.

* * * * *